(No Model.)

W. MUSSELWHITE.
EVAPORATING PAN.

No. 591,678. Patented Oct. 12, 1897.

Witnesses
T. Lloyd Mackabee
Jno. N. Cromwell.

By his Attorneys,
C. A. Snow & Co.

Inventor
Worley Musselwhite

UNITED STATES PATENT OFFICE.

WORLEY MUSSELWHITE, OF SALTVILLE, VIRGINIA.

EVAPORATING-PAN.

SPECIFICATION forming part of Letters Patent No. 591,678, dated October 12, 1897.

Application filed March 18, 1896. Serial No. 583,774. (No model.)

*To all whom it may concern:*

Be it known that I, WORLEY MUSSELWHITE, a citizen of the United States, residing at Saltville, in the county of Smythe and State of Virginia, have invented a new and useful Salt-Pan, of which the following is a specification.

This invention relates to the manufacture of salt, and more particularly to the evaporating pans or kettles used in connection therewith.

Heretofore where salt has been manufactured by evaporation the inner faces of the pans or kettles employed in such operation have become so scaled and the bottoms so covered with the scale that it has been necessary to stop the furnaces and remove such coating from the pans or kettles. This is very objectionable from the fact that the furnace remains idle during the removal of the salt, and consequently expense is involved.

It is the object of the present invention to overcome this difficulty by providing a pan or kettle which shall be so constructed as to prevent scaling of either its sides or bottom and by which the same may always be maintained in a clean state.

To this end the invention consists, substantially, in the construction, combination, and arrangement of parts, as will be hereinafter fully illustrated, described, and claimed.

Figure 1:
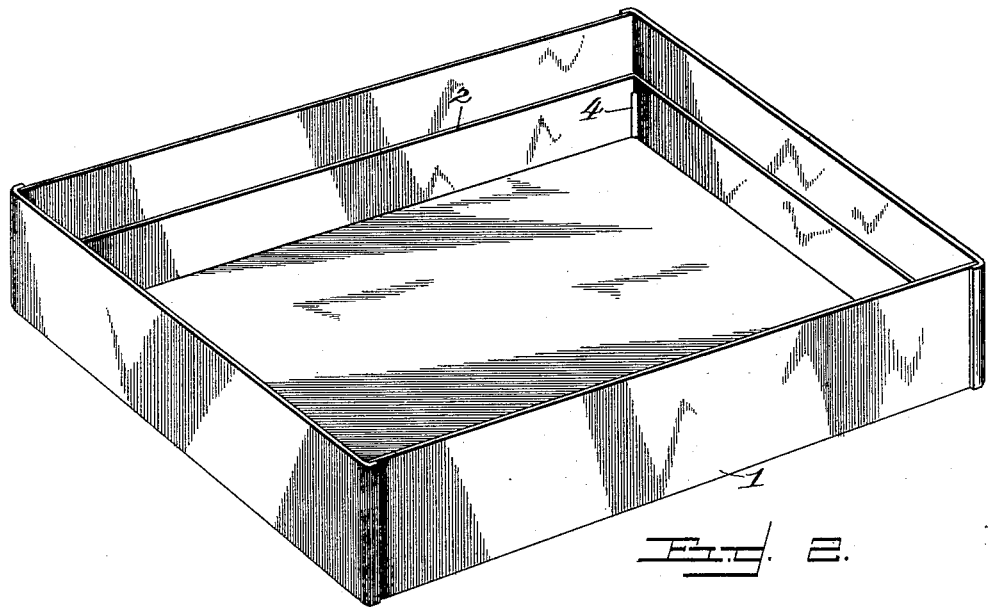
Figure 2:
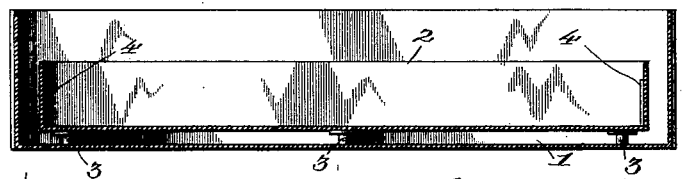
Figure 3:
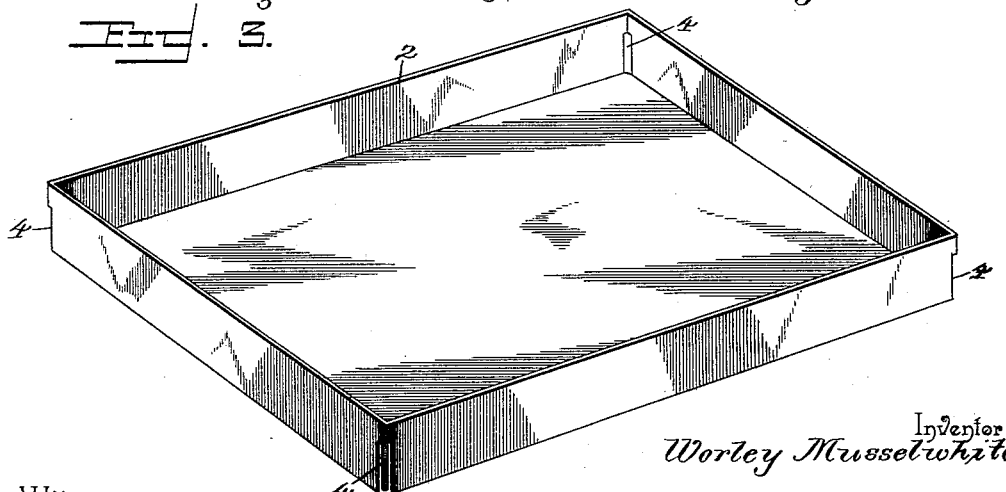

In the accompanying drawings, Figure 1 is a perspective view of a pan constructed in accordance with the present invention. Fig. 2 is a longitudinal sectional view thereof. Fig. 3 is a detail perspective view of the settling-pan.

Similar numerals of reference indicate corresponding parts throughout the figures.

Referring to the drawings, 1 designates a pan formed of any suitable material and designed for holding the salt water from which the salt is to be extracted. This pan is placed over a furnace or used in any other desired manner, whereby the water contained therein may be brought to the boiling-point.

Within the pan 1 is placed a settling-pan 2, essentially of smaller dimensions than the pan 1 and supported within the latter by studs 3. The pan 2 is of less height than the pan 1 for permitting the former to be entirely surrounded and covered by the water within the latter, and in order that such water may have a free circulation through said pan 2 the same has lateral openings 4, preferably formed at each of its corners.

The operation and advantages of the herein-described pan will be readily understood by those skilled in the art. The settling-pan 2 having been placed within the pan 1 the latter is filled with salt water until the pan 2 is entirely covered. The water has free circulation through the openings 4 and around the pan 2, and as the same boils the salt forms and settles in the settling-pan on the imperforate bottom thereof, thus leaving the sides and bottom of the pan 1 always free and clean. It will therefore be seen that when the pan 2 becomes filled with salt it may be emptied and returned to the pan 1, or another settling-pan may be substituted therefor, thereby enabling the furnace to be continuous in operation. From the fact that the sides and bottom of the pan 1 are free from the scale it is also evident that a smaller amount of heat will be required and a saving in fuel effected.

While this invention has been described as applied to a pan it will be understood that the same construction may be used in kettles employed for analogous purposes, and I wish it to be further understood that I do not limit myself to applying the invention to a furnace, as I may attain equally as good results where salt is made by steam.

Having thus described my invention, what I claim as new is—

1. A salt-evaporating apparatus comprising an outer imperforate receptacle adapted to hold the liquid for evaporation, a smaller inner settling-pan arranged within the outer receptacle out of contact with the bottom thereof and all of its sides, said inner pan being materially shallower than the outer receptacle so as to lie entirely below the plane of the upper edge of the outer receptacle, and provided with an imperforate bottom, and lateral circulating-openings arranged to communicate with the intervening space between the sides of the outer receptacle and the inner pan, and supporting means for the inner settling-pan, substantially as set forth.

2. A salt-evaporating pan or kettle, comprising an outer pan adapted to contain the salt water, and a settling-pan of less width and height than the outer pan and disposed within the same and provided with a circulating-opening at its corners, and feet at the bottom to hold it above and out of contact with the outer pan, substantially as set forth.

In testimony that I claim the foregoing as my own I have hereto affixed my signature in the presence of two witnesses.

WORLEY MUSSELWHITE.

Witnesses:
E. MIDDLETON,
F. W. KELLY.